United States Patent [19]

Taniishi

[11] Patent Number: 4,853,496
[45] Date of Patent: Aug. 1, 1989

[54] ACOUSTIC COORDINATE INPUT DEVICE USING A ROUGHENED SURFACE TO ATTENUATE THE SURFACE WAVE COMPONENT

[75] Inventor: Shinnosuke Taniishi, Tokyo, Japan

[73] Assignee: Canon Kabushiki Kaisha, Tokyo, Japan

[21] Appl. No.: 171,747

[22] Filed: Mar. 22, 1988

[30] Foreign Application Priority Data

Mar. 27, 1987 [JP] Japan ................. 62-071400
Apr. 1, 1987 [JP] Japan ................. 62-077547

[51] Int. Cl.⁴ .......................................... G08C 21/00
[52] U.S. Cl. ...................................... 178/18; 367/907; 340/706

[58] Field of Search .................... 178/18, 19; 367/907, 367/117, 127; 340/706

[56] References Cited

U.S. PATENT DOCUMENTS

4,665,282  5/1987  Sato et al. ................. 340/706 X

Primary Examiner—Stafford D. Schreyer
Attorney, Agent, or Firm—Fitzpatrick, Cella, Harper & Scinto

[57] ABSTRACT

A coordinates input device comprises vibration means for generating vibration, a pin having an end to which the vibration generated by said vibration means is transmitted, and a vibration transmission plate having a roughened surface or resin coating on a pen abutment surface thereof, for transmitting the vibration.

8 Claims, 9 Drawing Sheets

WH

ACOUSTIC COORDINATE INPUT DEVICE USING A ROUGHENED SURFACE TO ATTENUATE THE SURFACE WAVE COMPONENT

BACKGROUND OF THE INVENTION

1. Field of the Invention

The present invention relates to a coordinates input device, and more particularly to a coordinates input device which detects vibration input by a vibration pen by a plurality of sensors arranged on a vibration transmission plate to detect coordinates of the vibration pen on the vibration transmission plate.

2. Related Background Art

Conventional coordinates input device using various types of input pens and tablets for inputting hand-written characters or pattern into a processor such as a computer has been known. The image information of characters or pattern input by such an input device is output by a display such as a CRT display or a recorder such as a printer.

The coordinates detection of the tablet in such a system uses one of the following methods.

(1) A change in resistance of a sheet material arranged to face a resistive film is detected.

(2) An electromagnetic or electrostatic induction of a conductive sheet arranged to face a coil (an inductor) is detected.

(3) An ultrasonic vibration transmitted from an input pen to a tablet is detected.

In the methods (1) and (2) above, since the resistive film and the conductive film are used, it is difficult to provide a transparent tablet. On the other hand, in the method (3) above, the tablet may be made of transparent material such as acryl plate or glass plate. Accordingly, the input tablet may be overlaid on a liquid crystal display so that it may be used as if an operator writes a pattern on a paper. Thus, an information input/output device having a high operability is provided.

However, in the method which uses the ultrasonic vibration, the transmission of the vibration is impeded by a crack or obstacle on the vibration transmission plate of the tablet, and a detection precision is lowered.

It has been proposed to vibrate the vibration transmission plate of the tablet by using a plane wave of an elastic wave to reduce an affect by the crack or obstacle on the vibration transmission wave. However, in this method, since a surface wave component of the vibration affects to a detection waveform of the vibration sensor depending on an operation condition such as a vibration pen pressure or inclination, high precision coordinates input is not attained.

SUMMARY OF THE INVENTION

It is an object of the present invention to improve a contact between a vibration pen and a vibration transmission plate which is in contact with the vibration pen to transmit the vibration.

It is another object of the present invention to provide a coordinates input device having an improved writing touch of a vibration pen.

It is a further object of the present invention to readily provide a coordinates input device having an improved writing touch of a vibration pen.

It is another object of the present invention to provide a coordinate input device capable of a high precision coordinates input by eliminating a surface wave component of a vibration input which causes an error in coordinates detection precision.

It is yet another object of the present invention to provide a coordinates input device capable of a high precision coordinates input by roughening a surface of a vibration transmission plate to attenuate a surface wave component of a vibration input which causes an error in coordinates detection precision.

It is still a further object of the present invention to provide a coordinates input device capable of a high precision coordinates input by forming on a surface of a vibration transmission plate a resin layer for absorbing a surface wave component of a vibration input which causes an error in coordinates detection precision.

DETAILED DESCRIPTION OF THE PREFERRED EMBODIMENTS

The present invention is now explained with reference to an embodiment illustrated in the drawings.

Figure 1:
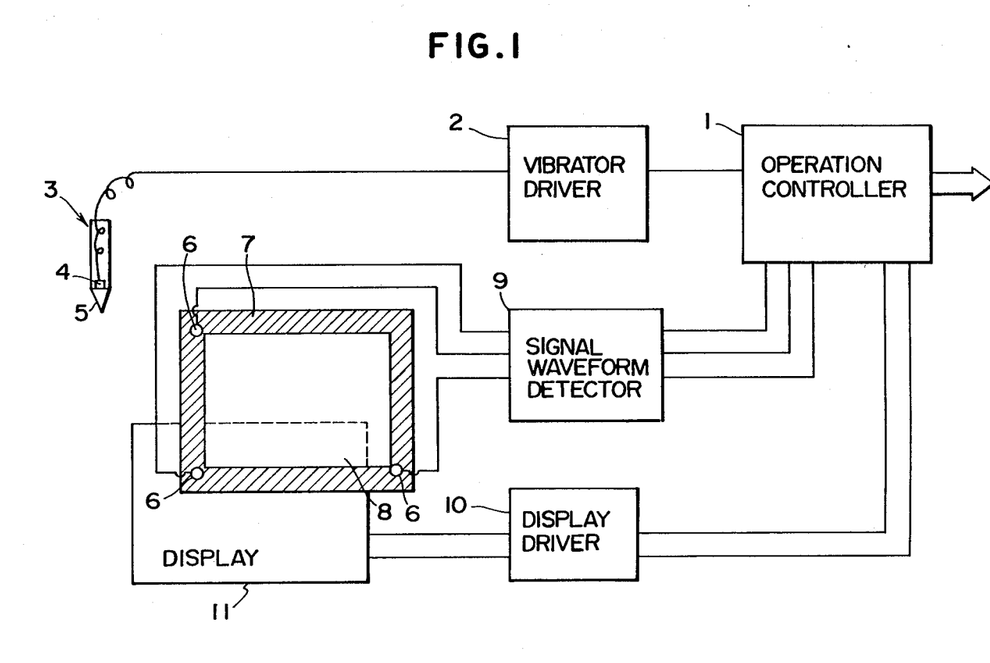
FIG. 1 shows a configuration of an information input/output device in accordance with the present invention.

FIG. 1 shows a configuration of the coordinates input device in accordance with the present invention. In the information input/output device of FIG. 1, coordinates are input by a vibration pen 3 on an input tablet which may be a vibration transmission plate 8, and an input image is displayed on a display 11' which may be a CRT on which the input tablet is overlaid, in accordance with the input coordinates information.

Numeral 8 denotes the vibration transmission plate which may be made of acrylic plate or glass plate and which transmits vibration from the vibration pen 3 to vibration sensors 6 arranged at three corners. In the present embodiment, transmission time of ultrasonic vibration transmitted from the vibration pen 3 to the vibration sensors 6 through the vibration transmission plate 8 is measured to detect the coordinates of the vibration pen 3 on the vibration transmission plate 8.

The periphery of the transmission plate 8 is supported by an anti-reflection member 7 such as silicone rubber in order to prevent the vibration transmitted from the vibration pen 3 from being reflected at the periphery back to a center area.

The vibration transmission plate 8 is arranged on a dot-display device 11' such as CRT or liquid crystal display so that dots are displayed along lines drawn by the vibration pen 3. Namely, dots are displayed at those positions on the display 11' which correspond to the detected coordinates of the vibration pen 3. The image consisting of points or lines input by the vibration pen 3 is displayed to follow loci of the vibration pen as if it were drawn on a sheet.

In this system, it is possible to display a menu on the display 11' and select a menu item by the vibration pen, or display a prompt and contact the vibration pen 3 to a predetermined position.

The vibration pen 3 which transmits the ultrasonic vibration to the vibration transmission plate 8 has a vibrator 4 made of a piezoelectric element. The ultrasonic vibration generated by the vibrator 4 is transmitted to the vibration transmission plate 8 through a horn 5 having a pointed end.

Figure 2:
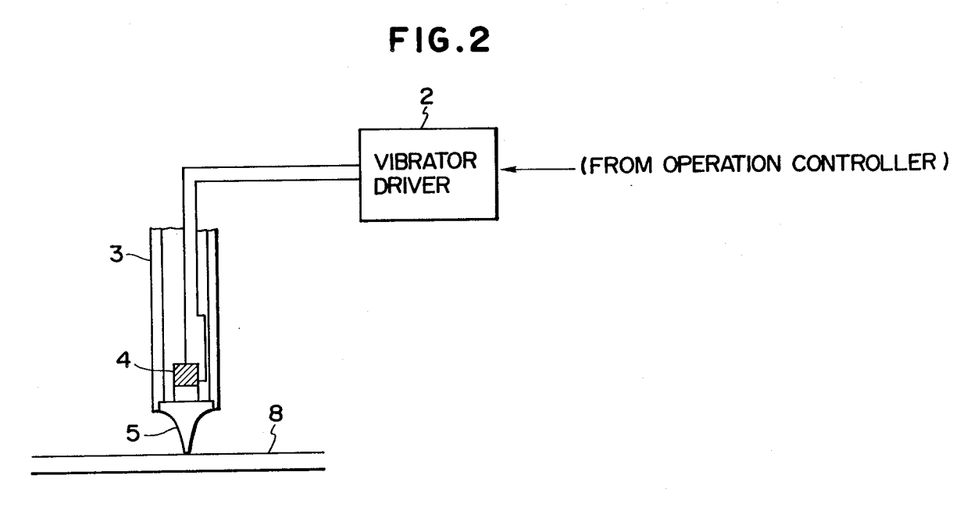
FIG. 2 shows a structure of a vibration pen of FIG. 1.

FIG. 2 shows a structure of the vibration pen 3. The vibration 4 in the vibration pen 3 is driven by a vibrator driver 2. A drive signal for the vibrator 4 is supplied from the operation controller of FIG. 1 as a low level pulse signal. It is amplified by the vibrator driver 2 which can drive at a low impedance and has a predetermined gain, and the amplified signal is applied to the vibrator 4.

The electrical drive signal is converted to a mechanical ultrasonic vibration by the vibrator 4, and it is transmitted to the vibration plate 8 through the horn 5.

The vibration frequency of the vibrator 4 is selected such that a plane wave can be generated in the vibration trransmission plate 8 such as acrylic plate or glass plate. When the vibrator is driven, a vibration mode is selected such that the vibrator 4 principally vibrates vertically in FIG. 2 to the vibration transmission plate 8. The vibration frequency of the vibrator 4 may be set to a resonance frequency of the vibrator 4 to attain vibration transformation at a high efficiency.

The elastic wave transmitted to the vibration transmission plate in this manner is a plane wave which is less affected by the crack or obstacle on the suface of the vibration transmission plate 8 than a surface wave.

Turning back to FIG. 1, the vibration sensors 6 arranged at the corners of the vibration transmission plate 8 are mechanical-electrical transducers such as piezoelectric elements. The output signals from the three vibration sensors 6 are applied to the waveform detector 9 where they are converted to signal forms which can be processed by the operation controller 1, which measures the vibration transmission time to detect the coordinates of the vibration pen 3 on the vibration transmission plate 8.

The detected coordinates information of the vibration pen 3 is processed by the operation controller 1 in accordance with the output scheme of the display 11'. The operation controller 1 controls the output operation of the display 11' through a display driver 10 in accordance with the input coordinates information.

Figure 3:
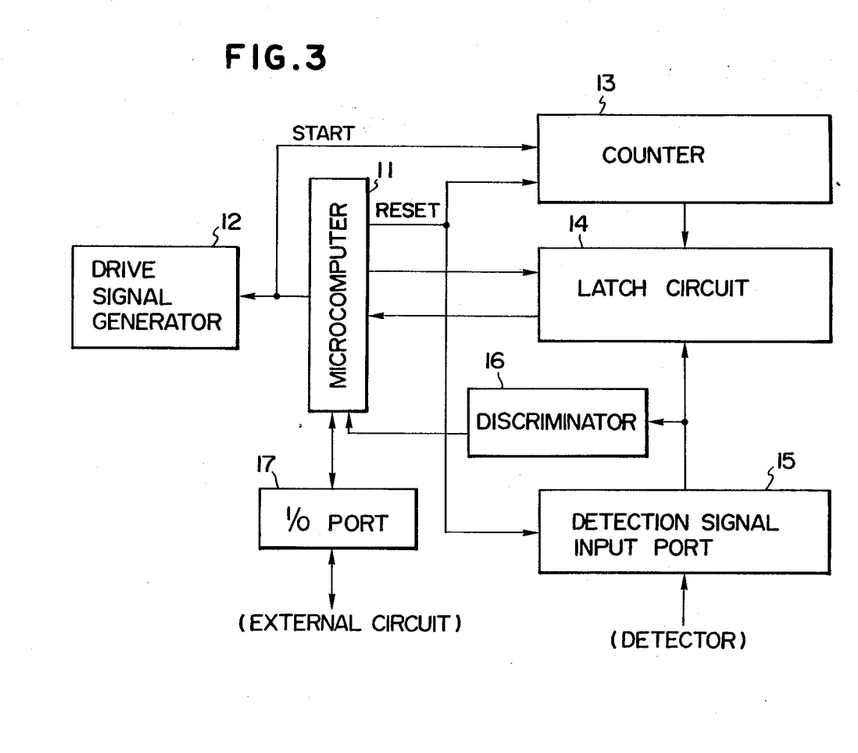
FIG. 3 shows a block diagram of an operation controller of FIG. 1.

FIG. 3 shows a configuration of the operation controller 1 of FIG. 1. It primarily shows a drive circuit for the vibration pen 3 and a vibration detection circuit by the vibration sensors 6.

A microcomputer 11 has an internal counter, a ROM and a RAM. A drive signal generation 12 generates a drive pulse at a predetermined frequency for the vibrator driver 2 of FIG. 1. It is started by the microcomputer 11 in synchronism with the coordinates operation circuit.

A count of a counter 13 is latched in a latch 14 by the microcomputer 11.

On the other hand, the waveform detector 9 produces, based on the output of the vibration sensor 6, timing information of the detection signal for measuring the vibration transmission time for the coordinates detection, and signal level information for the pen pressure detection. The timing and level information are applied to input ports 15 and discrimination 16, respectively.

The timing signal supplied from the waveform detector 9 is applied to the input port 15, compared with the count of the latch 14 by the discriminator 16, and the result is informed to the microcomputer 11. The vibration transmission time is expressed by the latched data of the counter 13, and the coordinates are calculated based on the vibration transmission time.

The output operation of the display 11' is controlled through an input/output port 17.

Figure 4:
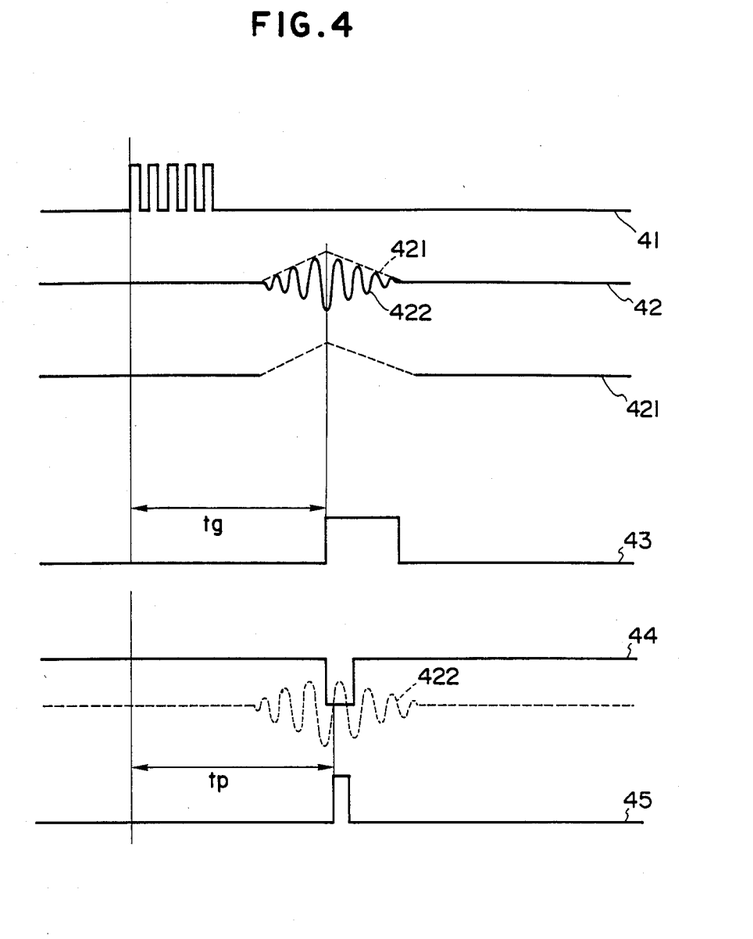
FIG. 4 shows detection waveforms for explaining measurement of a distance between a vibration pen and a vibration sensor.

FIG. 4 shows waveforms applied to the waveform detector 9 of FIG. 1 and illustrates measurement of the vibration transmission time. Numeral 41 denotes a drive signal pulse applied to the vibration pen 3. The ultrasonic vibration transmitted to the vibration transmission plate 8 from the vibration pen 3 driven by the pulse 41 propagates through the vibration transmission plate 8 and is detected by the vibration sensors 6.

The vibration propagate through the vibration transmission plate 8 in a time tg representing a distance to the vibration sensor 6 and it reaches the vibration sensor 6. Numeral 42 denotes a signal waveform detected by the vibration sensor 6. The plane wave used in the present embodiment is a dispersive wave. Accordingly, a relationship between an envelope 421 and a phase 422 of the detected waveform relative to a propagation distance in the vibration transmission plate 8 changes with the transmission distance during the transmission of the vibration.

The envelope has a group velocity Vg and a phase velocity Vp. The distance between the vibration pen 3 and the vibration sensor 6 is detected based on a difference between the group velocity and the phase velocity.

The envelope 421 is considered first. It has the velocity Vg. When a particular point on the waveform such as a peak is detected as shown by 43 in FIG. 4, the distance d between the vibration pen 3 and the vibration sensor 6 is given by $$d = Vg \cdot tg \qquad (1)$$

where tg is the vibration transmission time. The formula (1) relates to one of the vibration sensors 6. The distances between the vibration pen 3 and two other sensors 6 are given by the same formula.

In order to determine more accurate coordinates, the process based on the detection of the phase signal is effected. The distance between the vibration sensor and the vibration pen is given by $$d = n \cdot \lambda p + Vp \cdot tp \qquad (2)$$

where tp is a time of a particular detection point on the phase waveform 422 of FIG. 4, for example, from the application of vibration to a zero-crossing point after the peak, λp is a wavelength of the elastic wave and n is an integer.

From the formulas (1) and (2), the integer n is given by $$n = [(V_g \cdot t_g - V_p \cdot t_p)/\lambda_p + 1/N] \quad (3)$$

where N is a real number other than 0. For example, when N=2, n may be determined if within ±½ wavelength. In this manner, n is determined.

The n thus determined is substituted in the formula (2) so that the distance between the vibration pen 3 and the vibration sensor 6 can be precisely measured.

Figure 5:
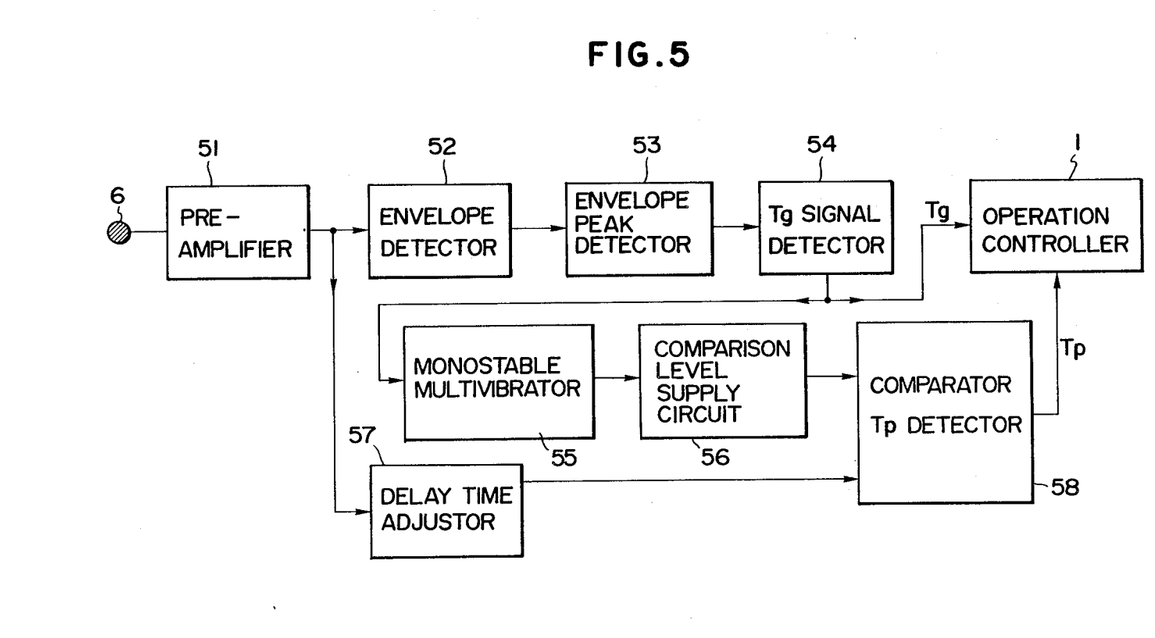
FIG. 5 shows a block diagram of a waveform detector of FIG. 1.

The vibration transmission times tg and tp shown in FIG. 4 are measured by the waveform detector 9 of FIG. 1. The waveform detector 9 is configured as shown in FIG. 5. The waveform detector of FIG. 5 also processes the level information of the output waveform of the vibration sensor 6 to detect the pen pressure.

In FIG. 5, the output signal of the vibration sensor 6 is amplified to a predetermined level by a pre-amplifier 51. The amplifed signal is supplied to an envelope detector 52 which extracts only an envelope of the detected signal. A timing of a peak of the extracted envelope is detected by an envelope peak detector 53. The peak detector signal is applied to a signal detector 54 which may be a monostable multivibrator and produces an envelope delay time detection signal Tg, which is supplied to the operation controller 1.

A phase delay time detection signal Tp is produced by a comparator detector 58 based on the signal Tg and an original signal delayed by a delay time adjuster 57, and it is supplied to the operation controller 1.

The circuit shown above is for one of the vibration sensors 6. The same circuit is provided for each of the rest. Where there are h sensors, the h envelope delay time detection signals Tg1-Tgh and the h phase delay time detection signals Tp1-Tph are supplied to the operation controller 1.

The operation controller of FIG. 3 receives the signals Tg1-Tgh and Tp1-Tph from the input port 15 and latches the count of the counter 13 at the timing of those signals. Since the counter 13 is started in synchronism with the drive of the vibration pen as described above, the latch 14 latches data which represent both the delay times of the envelope and the phase.

Figure 6:
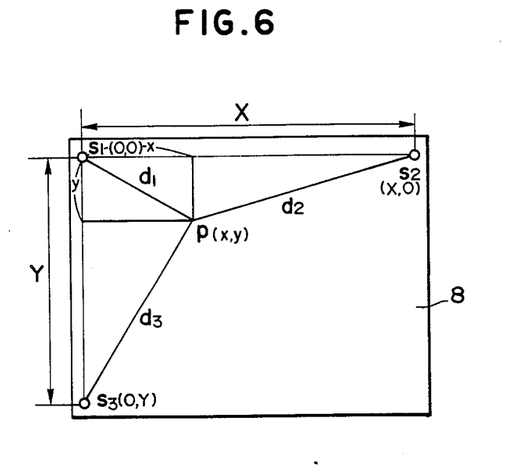
FIG. 6 shows arrangement of a vibration sensor.

When the three vibration sensors 6 are arranged at the corners S1-S3 of the vibration transmission plate 8 as shown in FIG. 6, it is possible to determine distances d1-d3 from the position p of the vibration pen 3 to the positions of the vibration sensors 6 as explained above in connection with FIG. 4. The operation controller 1 determines the coordinates (x, y) of the position p of the vibration pen 3 based on the distances d1-d3 in accordance with the theorem of three squares (Pythagoream theorem).

$$x = X/2 + (d1+d2)(d1-d2)/2X \quad (4)$$

$$y = Y/2 + (d1+d3)(d1-d3)/2Y \quad (5)$$

where X and Y are distances along X-axis and Y-axis between the vibration sensors 6 at S2 and S3 and the sensor at the origin point (S1).

In this manner, the position coordinates of the vibration pen 3 are detected real time.

In the above arrangement, since the ultrasonic vibration is transmitted to the vibration transmission plate 8 as the plane wave of the elastic wave, the disturbance by the crack or obstacle on the vibration transmission plate 8 is reduced and high precision coordinates detection is attained.

Figure 7:
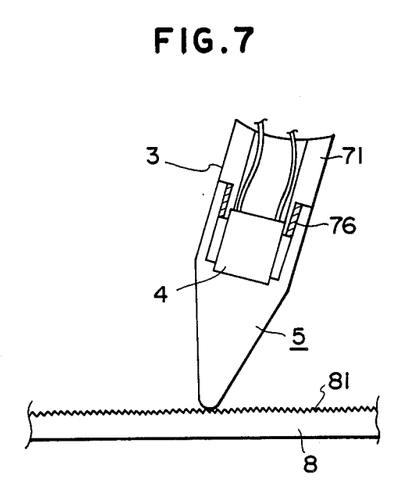
FIG. 7 shows a surface status of a vibration transmission plate.

In the present embodiment, a fine uneven surface is provided on the vibration transmission plate 8, as shown in FIG. 7. Numeral 71 denotes a bottom of a body of the vibration pen 3. The horn 5 is coupled to the end of the bottom 71 by a threaded portion 76.

The vibration transmission plate 8 has the fine uneven surface to roughen the surface. The roughness is no less than #2000 of the mesh number.

With such a roughness, the transparency of the vibration transmission plate 8 is not reduced and the visibility of the underlying display is not lowered. The external light is diffusedly reflected by the surface roughness so that the visibility of the display is enhanced. The writing touch of the vibration pen 3 is also enhanced.

The roughening may be effected not only on the front surface of the vibration transmission plate 8 but also on the back surface of the vibration transmission plate 8 to control the transparency of the vibration transmission plate 8 and the scattering of the external light and display light.

The vibration detection characteristic is also improved by roughening the surface of the vibration transmission plate 8.

Figure 8:
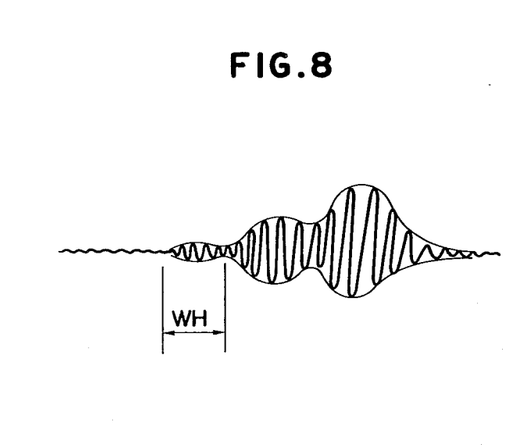
FIGS. 8 and 9 show vibration detection waveforms for vibration transmission plates with and without an uneven surface, respectively.
Figure 9:
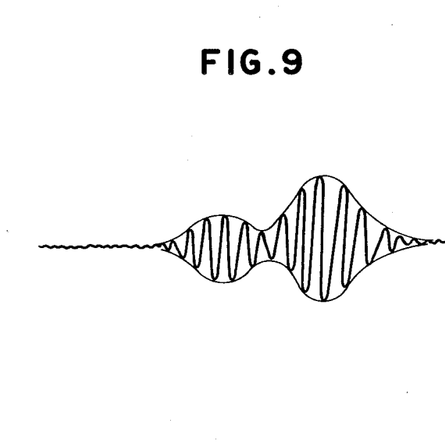

FIGS. 8 and 9 show vibration detection waveforms produced by the vibration sensor 6 located at the corner of the vibration transmission plate 8, without and with the roughening, respectively.

Without the roughening, as shown in FIG. 8, the surface wave input to the vibration transmission plate 8 by the inclination of the vibration pen 3 is combined with the transmitted vibration so that a peak Wh appears. Depending on a detection threshold, the peak by the surface wave component may be misdetected by the peak detection and an error is caused in the vibration transmission time or the coordinates detection precision.

When the vibration transmission plate 8 is roughened, the surface wave component is attenuated by the uneven surface of the vibration transmission plate 8 and no peak due to the surface wave component appears as shown in FIG. 9. Accordingly, high precision coordinates detection is attained.

Figure 10:
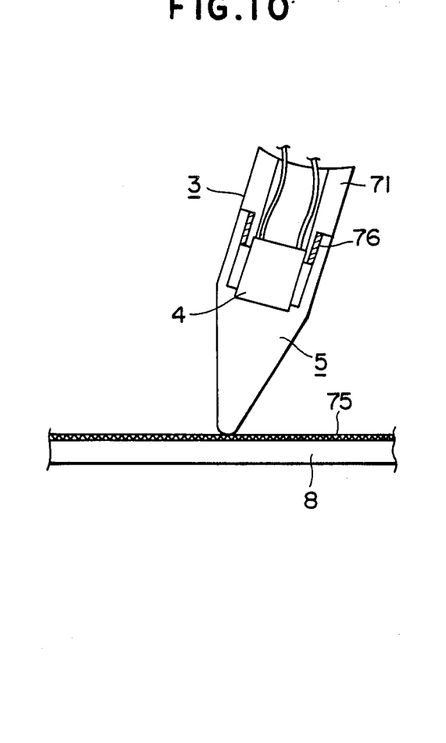
FIG. 10 shows a surface status of the vibration transmission plate.

In the present embodiment, a resin layer 75 is provided on the surface of the vibration transmission plate 8, as shown in FIG. 10, numeral 71 denotes a bottom of the body of the vibration pen 3, and the horn 5 is coupled to the end thereof by a threaded portion 76.

A resin layer 75 is coated on the surface of the vibration transmission plate 8. The resin layer 75 is made of appropriate material to attain a desired attenuation for the surface wave.

The experiment showed that fluorine resin, silicone resin and high molecular polyethylene are suitable for the surface wave vibration, any other material which meets the vibration absorption requirement may be used.

By properly selecting the material and thickness of the resin layer 75, it is possible to prevent the transparency of the vibration transmission plate 8 from being lowered and the visibility of the underlying display from being lowered. By the provision of the resin layer 75, the external light may be diffusedly reflected to improve the visibility of the display. The writing touch of the vibration pen 3 is also enhanced.

The resin layer 75 may be coated not only on the front surface of the vibration transmission plate 8 but also on the back surface thereof to control the transparency of the vibration transmission plate 8 or the scattering of the external light or display light.

By the provision of the resin layer 75 on the surface of the vibration transmission plate 8, the vibration detection characteristic may be enhanced.

Figure 11:
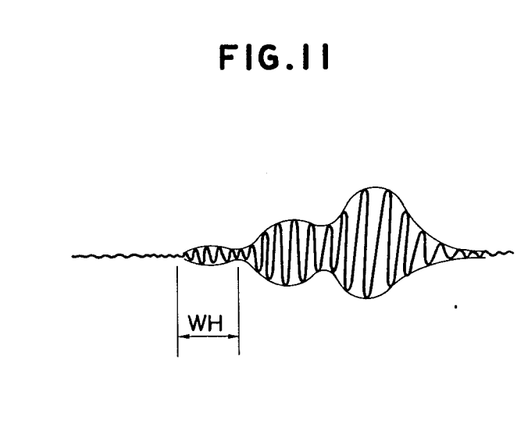
FIGS. 11 and 12 show vibration detection waveforms for the vibration transmission plates with and without a resin layer, respectively.
Figure 12:
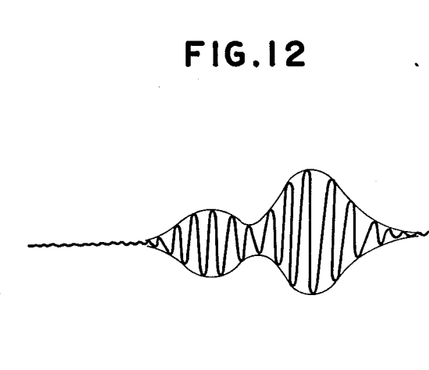

FIGS. 11 and 12 show the vibration detection waveforms produced by the vibration sensor 6 located at the corner of the vibration transmission plate 8 without and with the resin layer 75, respectively.

Without the resin layer 75, as shown in FIG. 11, the surface wave input to the vibration transmission plate 8 by the inclination of the vibration pen 3 is combined with the transmitted vibration so that a peak Wh is produced. Depending on a detection threshold, the peak of the surface wave component is misdetected by the peak Wh and error is created in the vibration transmission time and the coordinate detection precision.

On the other hand, when the resin layer 75 is formed on the vibration transmission plate 8, the surface wave component is attenuated by the resin layer 75 of the vibration transmission plate 8 and the peak due to the surface wave component is not produced as shown in FIG. 12. Accordingly, high precision coordinates detection is attained.

I claim:

1. A coordinates input device comprising:
   vibration generation means for generating vibration;
   a vibration pen adapted to vibrate at an end thereof in response to the vibration generated by said vibration generation means and transmitted to the pen; and
   a vibration transmission plate having a roughened abutment surface presented to the vibration pen for reducing a surface wave component in order to eliminate the surface wave component of the transmitted vibration.

2. A coordinates input device according to claim 1 further comprising a sensor arranged on the roughened surface of the vibration transmission plate for detecting the vibration transmitted through said vibration transmission plate.

3. A coordinates input device according to claim 2 further comprising operation means for calculating an abutment position of said vibration pen based on a detection time of the vibration detected by said sensor.

4. A coordinates input device according to claim 1 further comprising a display provided on an underside of said vibration transmission plate.

5. A coordinates input device comprising:
   vibration generation means for generating vibration;
   a vibration pen adapted to vibrate at an end thereof in response to the vibration generated by said vibration generation means and transmitted to the pen; and
   a vibration transmission plate having a resin layer formed on a pen abutment surface thereof for absorbing a surface wave component in order to eliminate the surface wave component of the transmitted vibration.

6. A coordinates input device according to claim 5 further comprising a sensor arranged on the surface having the resin layer formed thereon of said vibration transmission plate.

7. A coordinates input device according to claim 6 further comprising operation means for calculating an abutment position of said vibration pen based on a detection time of the vibration detected by said sensor.

8. A coordinates input device according to claim 5 further comprising a display provided on an underside of said vibration transmission plate.

* * * * *